Dec. 29, 1970     C. VAN DER LELY     3,550,360
MOWING DEVICE
Filed June 14, 1967     6 Sheets-Sheet 1
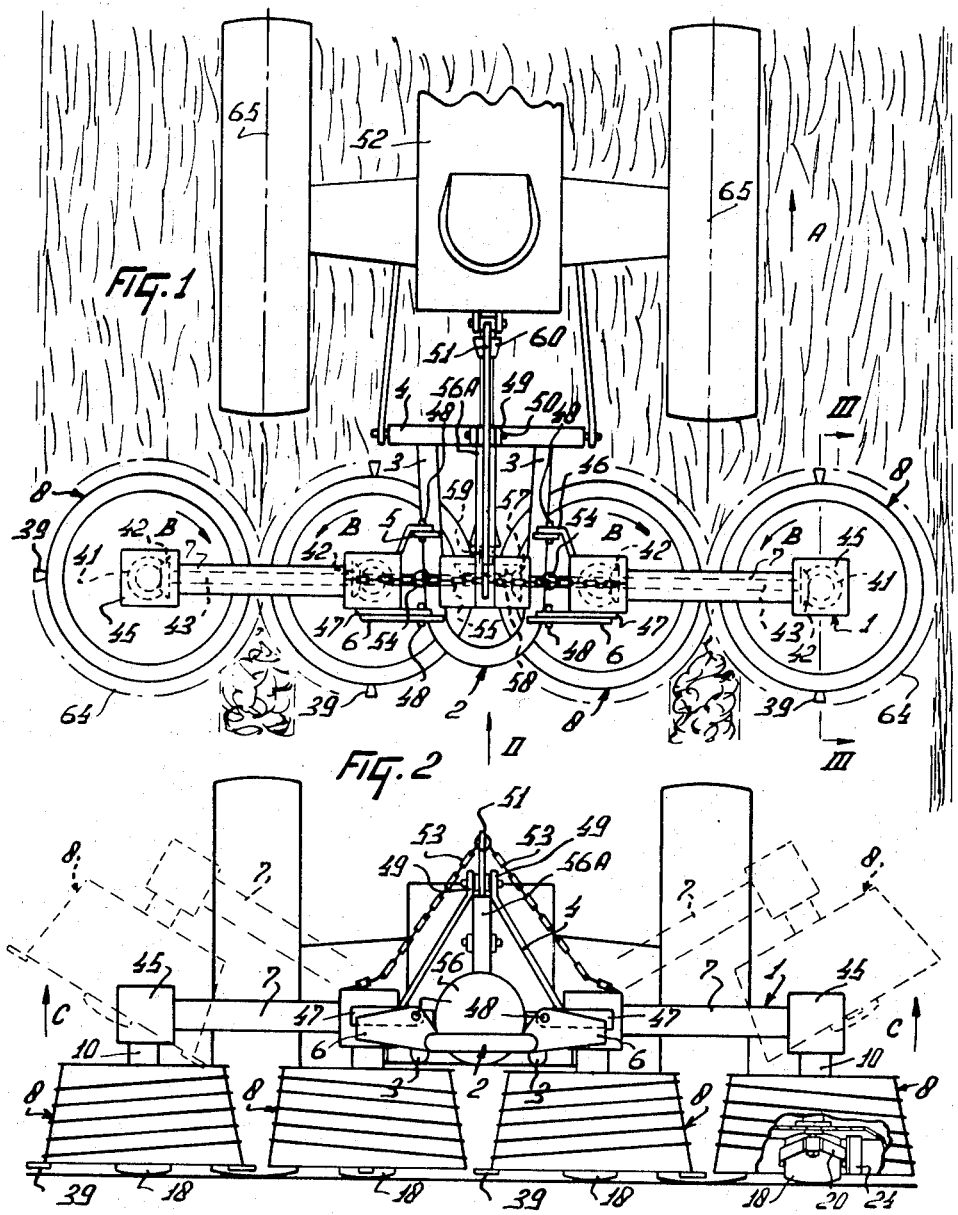
INVENTOR
CORNELIS VAN DER LELY
BY
Mason, Mason & Albright
Attorneys

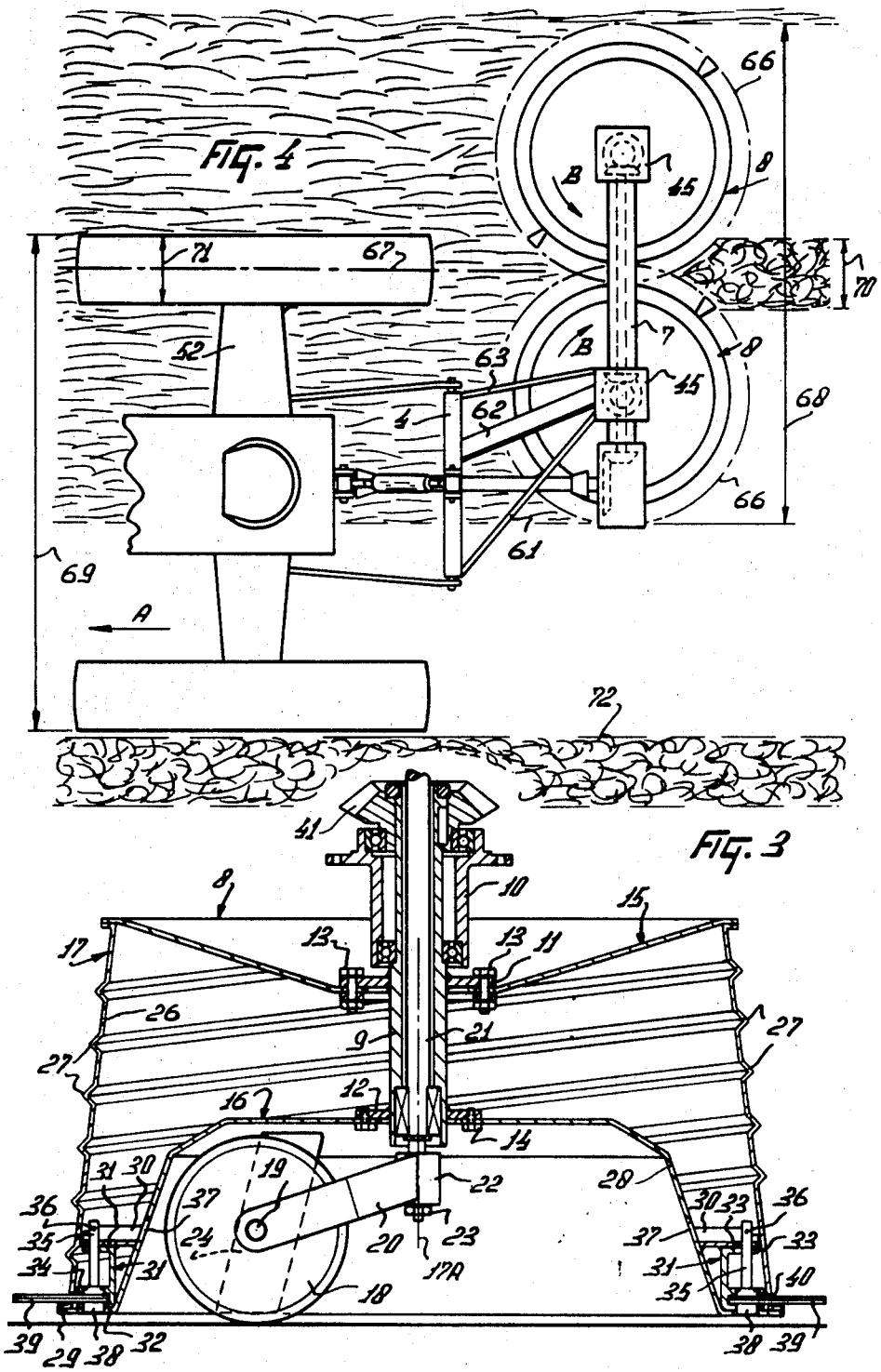

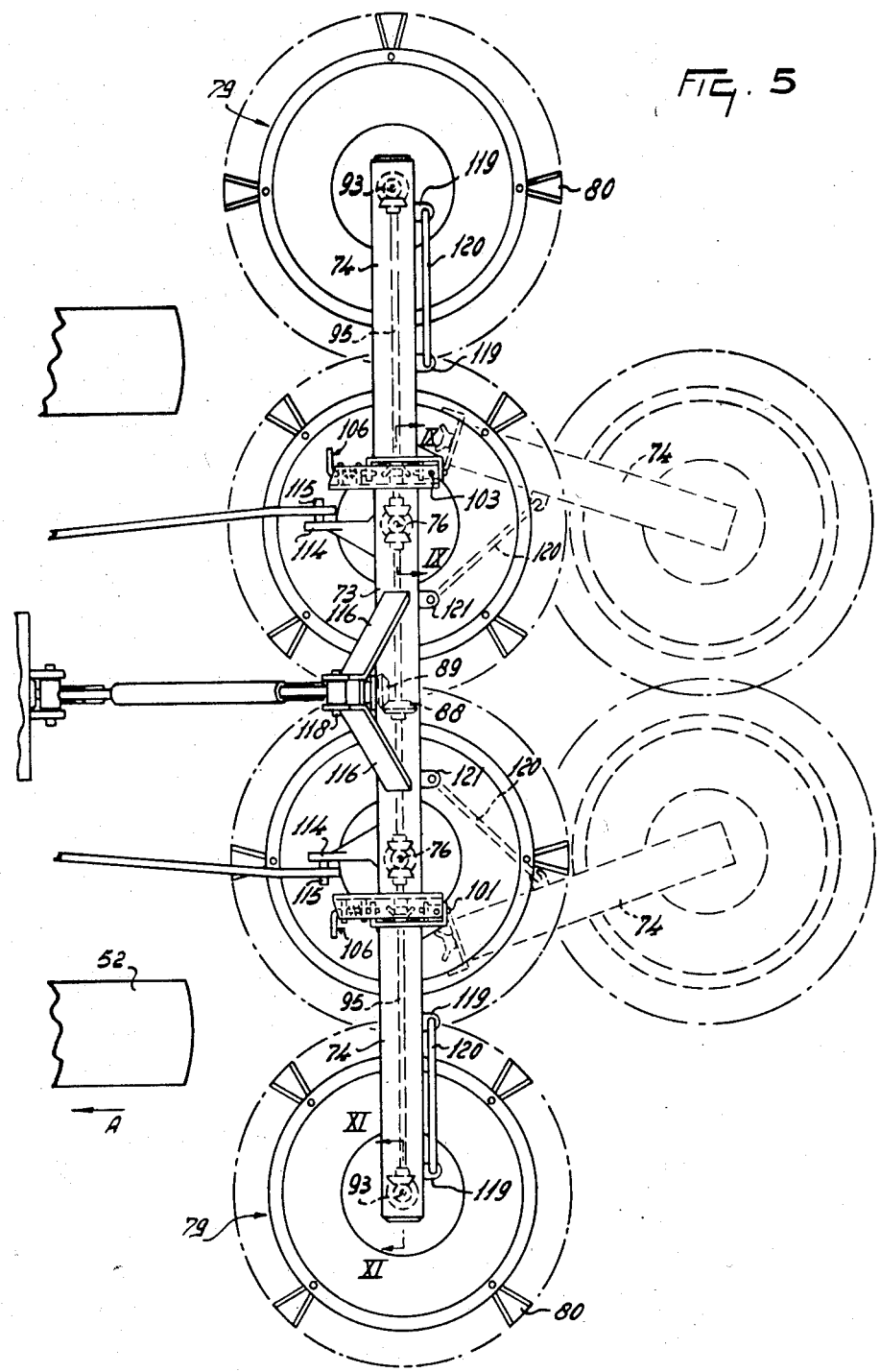

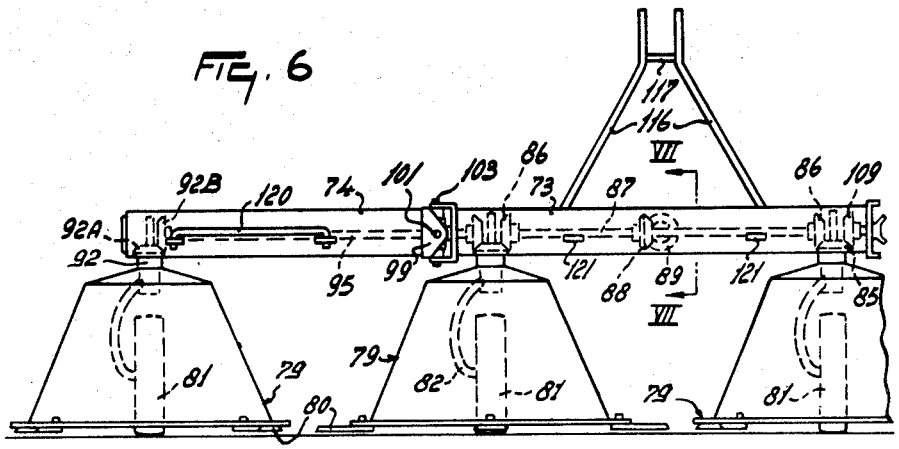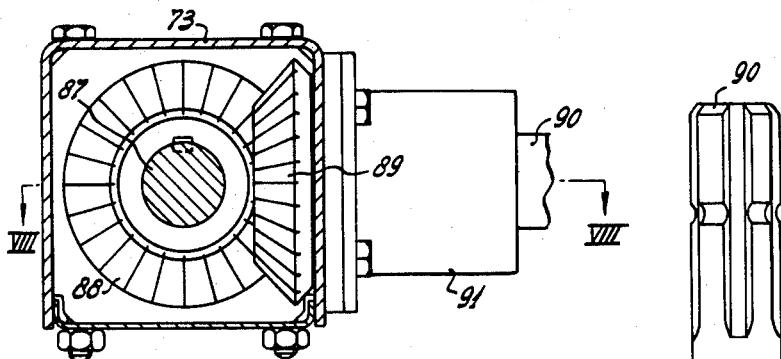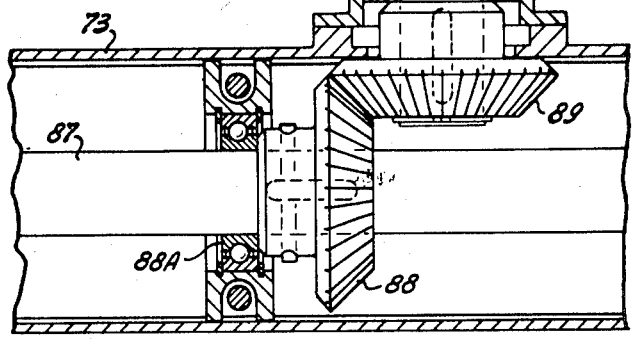

INVENTOR
CORNELIS VAN DER LELY
BY
Mason, Mason & Albright
Attorneys

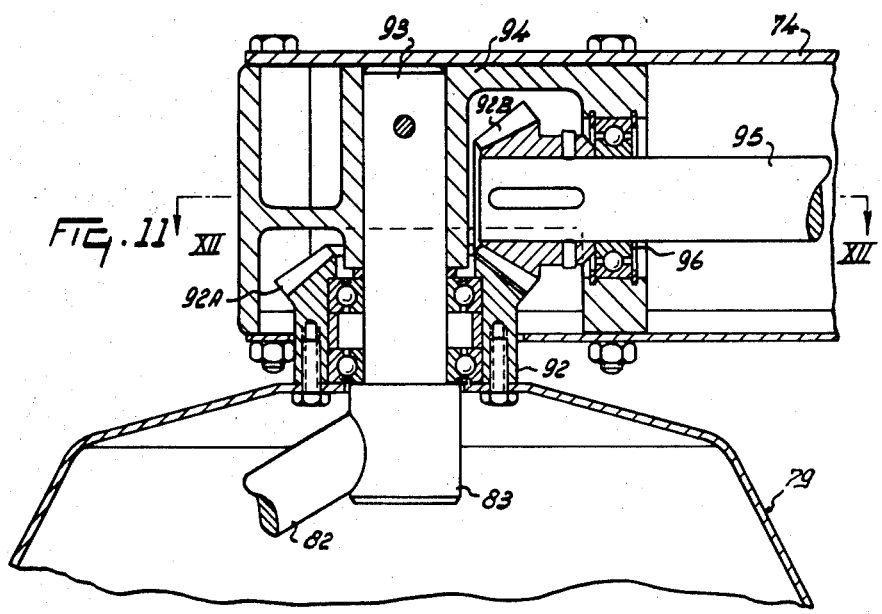
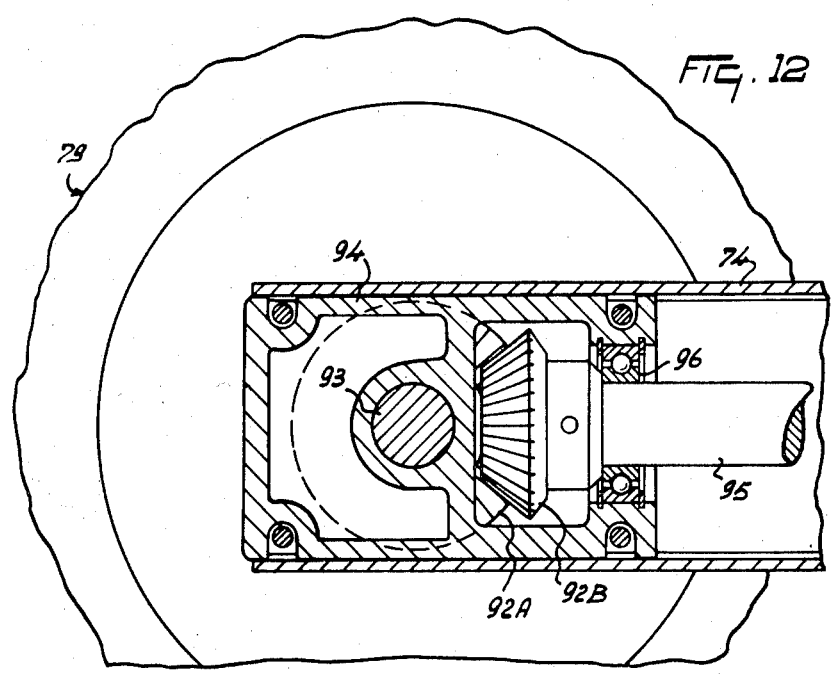

United States Patent Office 3,550,360
Patented Dec. 29, 1970

1

3,550,360
MOWING DEVICE
Cornelis van der Lely, 7 Bruschenrain,
Zug, Switzerland
Filed June 14, 1967, Ser. No. 646,092
Claims priority, application Netherlands, June 17, 1966,
6608499
Int. Cl. A01d 75/30
U.S. Cl. 56—6                                    17 Claims

ABSTRACT OF THE DISCLOSURE

A mowing device comprising a plurality of rotatably mounted mowing elements which are provided with cutting members and which are arranged side-by-side, with respect to the intended direction of operative travel of the device, so as to co-operate with each other to mow crop on the ground. The mowing elements are arranged so that at least one pair of mowing elements is positioned to trace a path which intersects or touches the track of a ground wheel of a propelling vehicle.

---

According to the invention there is provided a mowing device comprising a plurality of rotatably mounted mowing elements which are provided with cutting members and which are arranged side-by-side, with respect to the intended direction of operative travel of the device, so as to co-operate with each other to mow crop on the ground, characterized in that at least one pair of mowing elements is arranged on the device in such a way that, when the device is connected to a tractor or other vehicle for propelling the device, the paths traced by the outer tips of the cutting members of the mowing elements of said pair during operation of the device, touch or intersect substantially in the track of a ground wheel of said tractor or other vehicle.

Figure 9:
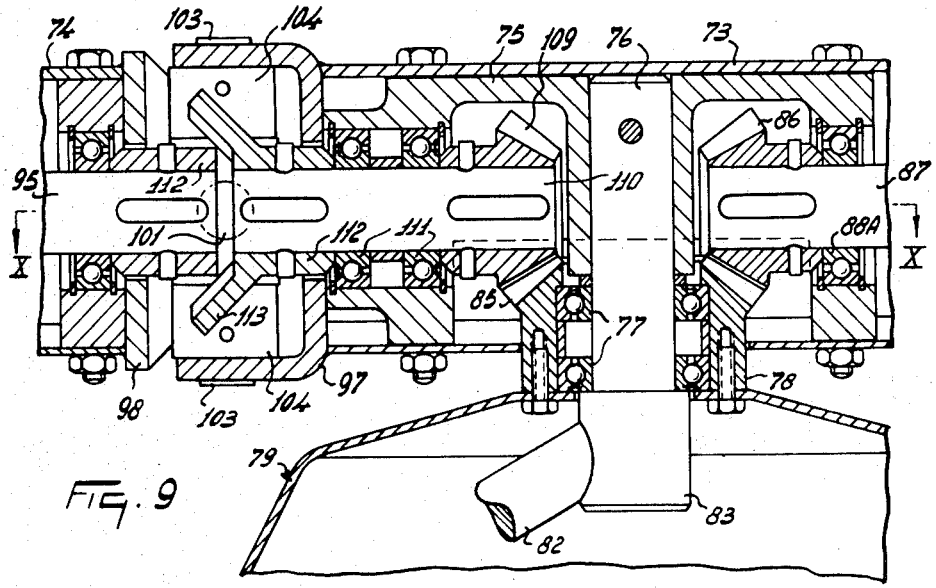
Figure 10:
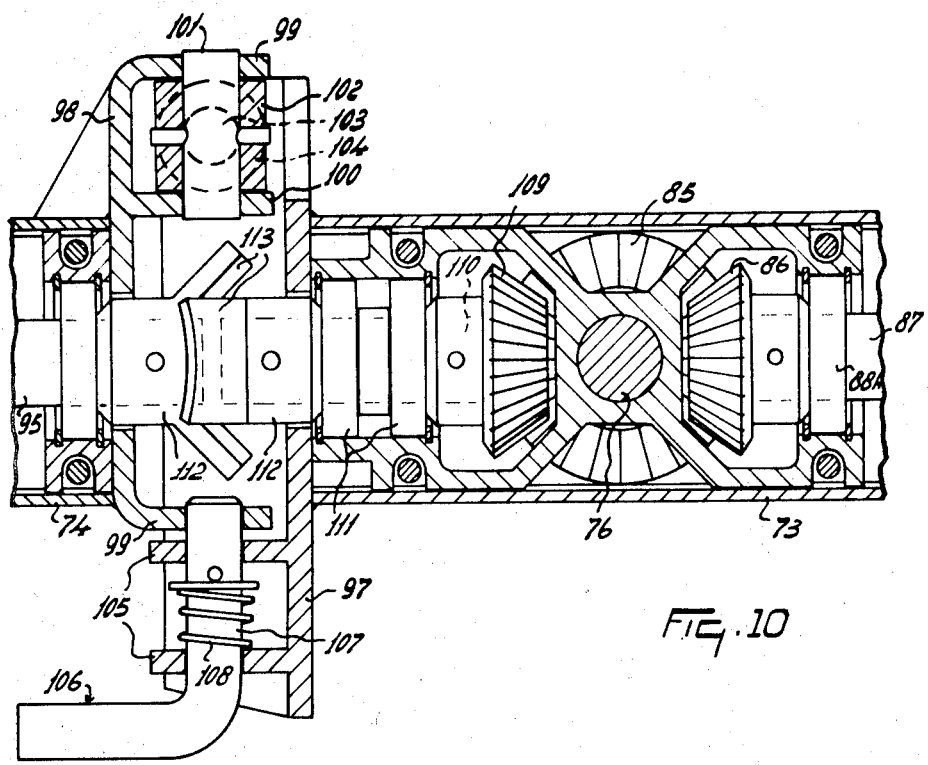

For a better understanding of the invention, and the method by which the same can be performed, reference will now be made, by way of example, to the accompanying drawings, in which:

FIG. 1 is a plan view of a mowing device in accordance with the invention, mounted behind a tractor, FIG. 2 is a view taken in the direction of the arrow II in FIG. 1, FIG. 3 is a sectional view, to an enlarged scale, taken on the line III—III in FIG. 1, FIG. 4 is a plan view, similar to FIG. 1, of a second embodiment of mowing device in accordance with the invention mounted behind a tractor, FIG. 5 is a plan view, similar to FIGS. 1 and 4, of a third embodiment of mowing device in accordance with the invention, FIG. 6 is a part rear view of the device of FIG. 5, FIG. 7 is a sectional view, to an enlarged scale, taken on the line VII—VII in FIG. 6, FIG. 8 is a sectional view taken on the line VIII—VIII in FIG. 7, FIG. 9 is a sectional view, to an enlarged scale, taken on the line IX—IX in FIG. 5, FIG. 10 is a sectional view taken on the line X—X in FIG. 9, FIG. 11 is a sectional view, to an enlarged scale, taken on the line XI—XI in FIG. 5, and FIG. 12 is a sectional view taken on the line XII—XII in FIG. 11.

Referring now to FIGS. 1 to 3 of the drawings, there is shown a mowing device mounted behind an agricultural tractor. The device comprises a frame indicated generally at 1 and including a horizontal frame beam 2. The frame beam 2 is U-shaped as seen in plan and the parallel limbs

2

3 of the beam 2 extend forwardly with respect to the intended direction of travel A of the tractor and mowing device. The forward ends of the limbs 3 are interconnected by a box 4. Each limb 3 is provided with two lugs 5 and 6 which are spaced apart from each other.

The frame 1 of the device comprises two further frame beams 7 which are aligned and extend transversely of the direction A on either side of the beam 2. Each beam 7 is provided with a pair of rotatable mowing elements 8. Each mowing element 8 comprises a substantially vertical shaft 9 (FIG. 3) which is journalled in a bearing 10. The upper side or end of each bearing 10 is secured to a corresponding frame beam 7. Two flanges 11 and 12 are secured to the shaft 9 and are spaced from each other along the axis of the shaft 9. The flange 11 is located directly below the bearing 10, whereas the flange 12 is located near the lower end of the shaft 9. An upwardly tapering or generally frusto-conical drum 17 is drivingly connected to the shaft 9 by means of bolts 13 and 14 which secure the upper and lower sides 15 and 16 respectively of the drum to the flanges 11 and 12 respectively. As seen in FIG. 3, the upper side 15 of the drum extends inwardly from the upper peripheral edge of the drum in the manner of an inverted cone. The lower side 16 of the drum is constructed so as to form a space in which a barrel-shaped ground wheel 18 is arranged. The ground wheel 18 is rotatably mounted between the prongs or limbs of a fork 20 by means of an axle 19. The fork 20 includes a sleeve 22 which is fastened to a shaft 21 that is secured to the beam 7 and is located below the lower end of shaft 9. A nut 23 retains the fork 20 in position. On one side of the ground wheel 18, between the lower side 16 of the drum 17 and the wheel 18 a scraper 24 is provided. The scraper 24 is located on the side of the wheel 18 alongside which the drum 17 moves towards the front side thereof. With the mowing element 8 shown in the extreme right hand position in FIGS. 1 and 2, the scraper 24 is located on the right hand side of the wheel 18. With the mowing element located alongside said extreme mowing element the scraper 24 is located on the left hand side of the wheel 18, that is the scrapers 24 are located on the sides of the wheels 18 alongside which the drums 17 move forwardly in the direction of the arrow B during operation.

The scrappers 24 act so as to prevent material getting in between the tire of the wheel 18 and the lower side 16 of the drum 17. The outer wall 26 of the drum 17 is formed with a helical ridge 27 which surrounds the periphery of the drum 17 as seen in FIG. 3. The lower side 16 of the drum is formed with a downwardly bent-over portion 28 which merges into a substantially horizontal rim portion 29 connected to the lower edge of the outer wall 26 of the drum. Inside the drum, between the bent-over portion 28 and the outer wall 26, a strip 30 is arranged on the bent-over portion 28 at a location spaced upwardly from the rim portion 29. Between the portion 29 and the strip 30, a U-shaped member 31 is provided, the limbs 32 and 33 of which extend substantially horizontally. Above the lowermost limb 32 a strip 34 is arranged which extends parallel to said limb. The limbs 32 and 33 of the member 31 and the strip 34 located above the lower limb 32 provided with apertures through which a pin 35 is taken, the pin 35 occupying a substantially vertical position. The upper end of the pin 35 can be secured in position by means of a safety pin or split pin 36. The pin 36 is accessible through an opening 37 formed in the portion 38 of the lower side 16. As seen in FIG. 3, the pin 35 is provided at its lower end with a thickened portion 38, a knife 39 being pivotally arranged about the portion 38 between the strip 34 and the lowermost limb 32 of the member 31. The knife 39 is taken through a slot 40 formed near the lower edge of the outer wall 26. Each drum is provided with two diametrically opposed knives 39. Parts of the knives 39 projecting outwardly from the drum 17 are shaped like a spatula (spoon-shaped) and have two cutting edges. The arrangement of the pins 35 between the outer walls 26 of the drums and the portion 28 enables the hollow portion inside the lower side of the drum to be flat so that no material can hook onto projecting parts. The ground wheel 18 is located inside the space below the side 16 and in front of the shaft 9 or 21 with respect to the direction of travel A. The upper end of shaft 9 carries a bevel gear wheel 41 which cooperates with a bevel gear wheel 42 mounted on a shaft 43 which is journalled inside the associated frame beam 7. The relatively cooperating level gear wheels 41 and 42 are housed in a gear box 45 which is secured to the frame beam 7. Each end of a frame beam 7 is provided with a drum-shaped mowing element 8 of the construction described above so that each frame beam 7 has a pair of mowing elements associated therewith. Each end of a frame beam 7 carries an associated gear-box 45, but gear-boxes 45 mounted on the inner ends of the frame beams 7 facing the frame beam 2 are provided with two lugs 46 and 47 which are pivoted by pins 48 to the lugs 5 and 6 provided on the limbs 3 of the U-shaped frame beam 2.

The box 4 is provided on its upper end with two parallel parts 49, between which an arm 51 is pivotally mounted on a shaft 50. The arm 51 is pivoted at its forward end to the frame of a tractor 52, and the three point hitch of the tractor can be coupled with the box 4. The rear end of the arm 51 is connected to two flexible members formed by chains 53. One chain 53 is connected to one of the inner gear boxes 45 and the other chain 53 is connected to the other inner gear box 45. The inner ends of the shafts 43 which are journalled in the frame beam 7 are coupled by universal joints 54 with shafts 55 extending transversely of the direction A and being journalled in the walls of a gear box 56. Each shaft 55 is provided with a bevel gear wheel 57 which meshes with a corresponding gear wheel 58 mounted on a shaft 59 which is also journalled in the gear box 56 and extends parallel to the direction A. The gear box 56 is arranged between the limits 3 of the U-shaped frame beam 2. The forward end of the shaft 59 can be coupled with the power take-off shaft of the tractor 52 by means of an intermediate shaft 60 and universal joints. Between the upper end of the box 4 and the gear box 56 a support 56A is provided. The universal joints 54 are located in line with corresponding pins 48 when viewed in the direction of travel.

During operation of the mowing device, it is moved in the direction of the arrow A and the drum-shaped elements can be driven by means of the power take-off shaft in the direction of the arrow B. The mowing elements are arranged so that two adjoining elements cooperate with each other so that an uninterrupted strip of crop is worked during operation. The four mowing elements provided in this first embodiment operate in pairs so as to cut and displace crop to the rear between the elements in each pair. In this way, two swaths are formed directly behind the tracks of the tractor wheels.

It will be apparent from FIG. 1 that each pair of drum-shaped mowing elements is located to one side of the longitudinal center line of the tractor and the mowing elements in each pair are located in such a way that the circles 64 traced by the tips of the cutting members touch or intersect each other approximately on a line 65 which extends parallel to the direction A and through the center of the track of a rear wheel of a tractor. In view of this arrangement, crop which is pressed down by the forward movement of the tractor over the ground can still be readily cut by the cutters 39 and displaced rearwardly between the elements in each pair. Therefore it is not necessary to arrange the mowing elements to one side of the tractor as is required by conventional mowing devices which are unable to cut satisfactorily crop which has been pressed down or flattened by the wheels of the tractor or other vehicle propelling the mowing device.

The ridges 27 provided on the outer surfaces of the drum 17 are helically or spirally wound so that they tend to lift the crop as the mowing elements rotate in the direction of the arrows B. This may have a favorable effect on the mowing operation and, moreover, the slight lifting of the crop moving to the rear between the mowing elements may have the advantage that the swath formed is higher and more loosely deposited. The upwardly tapering shape of the drums 17 also assist in this desirable swath formation.

It will be appreciated that other means than the ridges 27 may be provided for lifting the material as the mowing elements rotate or as the material is displaced to the rear between the elements.

It will be further appreciated that, when the mowing device is being towed by a vehicle other than a tractor, the mowing elements must be arranged with respect to the wheels of this other vehicle in similar manner as for the rear wheels or driving wheels of the tractor. The mowing device can be readily converted to a suitable transport position by operation of the three point hitch or lifting device of the tractor. When the hitch is moved upwardly, the arm 51 is pivoted upwardly so that the frame beams 7 are caused to pivot about the pins 48 in the direction of the arrows C by means of the chains 53, until the position shown in broken lines in FIG. 2 is reached.

The barrel shape of the ground wheels 18 enables each drum-shaped mowing element to follow satisfactorily unevenesses in the ground during operation. Moreover, each frame beam 7 which has a pair of mowing elements associated therewith is pivotable about associated pins 48 for the same purpose. The lengths of the chains 53 are chosen so that turning of the beams 7 with respect to the beam 2 for matching or following unevennesses in the ground is allowed.

The arrangement of the wheels 18 within the circles traced by the knives 39 of the mowing elements prevents the wheels 18 from rolling over the crop in an undesirable manner. Moreover, dirt and dust will thus less easily adhere to a wheel 18 and its associated shaft. A scraper 24 arranged between the lower side 16 of a drum and the associated ground wheel 18 acts so as to prevent stones and other articles from getting stuck between the wall 28 and the ground wheel 18 which may give rise to some damage.

The barrel-shape of the ground wheels 18 lessens the risk of the ground wheels sinking to an excessive depth into the ground, particularly in water-logged ground, which gives rise to damage of the turf by the cutters of the rotating drums. The knives 39 can be readily removed after the pins 36 have been withdrawn, so that the knives can be inverted or replaced.

Referring now to the second embodiment of mowing device shown in FIG. 4, parts corresponding with the first embodiment are designated by the same reference numerals. In this embodiment, only one frame beam 7 is provided which carries a single pair of mowing elements 8. One of the gear boxes 45 is secured to the box or frame 4 by means of supports 61, 62 and 63. In this embodiment, the single pair of mowing elements is arranged so that the circles 66 traced by the tips of the cutting members touch or intersect in a line 67 which extends parallel to the direction A and passes through the center of the track of one of the rear wheels of the tractor. The directions of rotation of the mowing elements are such that the cutters cross the track of the aforesaid rear wheel of the tractor in a generally rearward direction. The diameters of the mowing elements are chosen so that a strip of width 68 can be worked in one pass, the width 68 being approximately equal to or slightly larger than the width 69 of the tractor. A swath is produced between and behind the two mowing elements, the width 70 of the swath being approximately equal to the width 71 of one of the rear wheels of the tractor. With this arrangement, crop which is mown and delivered into a swath during a preceding run or pass is deposited at the side of the tractor as is shown in FIG. 4 for the swath 72. If the width 70 of the swath exceeds the width 71 of the rear wheel of the tractor, the distance 68 should exceed the over-all width 69 of the tractor by the same amount as the width 70 of the swath exceeds the width 71 of the tractor wheel, if it is desired that preceding swaths should lie alongside the tractor during the next successive pass.

Referring now to the third embodiment of mowing device shown in FIGS. 5 to 12, the device has a frame including a frame beam 73 extending transversely of the direction A and pivoted at its ends to frame beams 74 in a manner to be described. The frame beams 73 and 74 are substantially square in cross section. Near the ends of the central frame beam 73, stub shafts 76 (FIGS. 5 and 9) are arranged by means of supports 75 on the frame beam 73. A sleeve 78 is arranged on each stub-shaft 76 by means of a bearing 77, the sleeve 78 being secured to the upper side of a generally conical drum 79 affording a mowing element. As seen in FIG. 6, knives 80 are arranged at the lower peripheral edges of the drums 79. Four knives 80 are arranged symmetrically around each drum 79, the knives being pivotally mounted on the drums. Inside each drum 79 a ground wheel 81 is arranged which is connected by a supporting arm 82 to a sleeve 83 mounted on the lower end of a corresponding stub shaft 76. The sleeve 78 on each stub shaft 76 supports a corresponding drum-shaped mowing element and the sleeve 78 is provided on its upper end with a bevel gear wheel 85 which meshes with a bevel gear wheel 86 mounted on one end of a shaft 87 extending within and parallel to the frame beam 73. The shaft 87 is journalled in bearings 88A.

Near the center of the shaft 87 (FIG. 6) a bevel gear wheel 88 is mounted which meshes with a bevel gear wheel 89 mounted on a shaft 90 (FIGS. 7 and 8) which extends parallel to the direction A and is journalled in a side wall of the frame beam 73 by means of a bearing assembly 91. Each frame beam 74 is provided at an end remote from the frame beam 73 with a corresponding mowing element 84. Each outermost mowing element 84 which is arranged on one of the outer frame beams 74 is mounted on a corresponding stub shaft 93 (FIGS. 5, 11 and 12) by means of a sleeve 92. Each stub shaft 93 is arranged in its corresponding beam 74 by means of a support 94. In similar manner to the sleeve 78, the upper end of the sleeve 92 has a bevel gear wheel 92A which meshes with a bevel gear wheel 92B mounted on a shaft 95 which extends within and parallel to the corresponding beams 74. The shaft 95 is journalled in the corresponding beam 74 by means of bearings 96. As for the two innermost mowing elements 84, ground wheels 81 are arranged beneath the drums of the two outermost mowing elements 84.

The outer frame beams 74 are pivotally connected at their innermost ends to the central frame beam 73 and one of these pivotal connections is shown in more detail in FIGS. 9 and 10. The end of the frame beam 73 is provided with a plate 97 which extends parallel to the direction A and has bent-over upper and lower ends. The end of the frame beam 74 adjacent the central frame beam 73 is provided with a plate 98 which is bent over at right angles at its front and rear ends by a vertical portion 99 as seen in FIG. 10.

Each plate 98 is formed with a lug 100 and a block 102 is located near the center of the plate 98 between the lug 100 and the bent-over portion 99 of the plate 98. The block 102 is located in position by means of a pin 101. The block 102 is formed with recesses both on its upper and lower sides which accommodate stub shafts 103 which are fastened to the bent-over upper and lower sides of the corresponding plate 97. The block 102 is held in position by spacer rings 104. At the same level as the block 102 but on the side remote from the stub shafts 103, a pin 106 is taken through holes formed in two lugs 105 connected to the plate 97. The end of the pin 106 is taken through a hole formed in the bent-over portion 99 of the plate 98 and a spring 108 surrounds a portion 107 of the pin 106 located between the lugs 105. When the end of the pin 106 is located in the hole formed in the bent-over portion 99 of the plate 98, the longitudinal axis of the portion 107 is in line with the longitudinal center line of the horizontal stub shaft 193. Each bevel gear wheel 85 on a sleeve 78 meshes with a bevel gear wheel 109 mounted on a stub shaft 110 which is journalled in bearings 111 and which projects through a hole formed in the plate 97 from the frame beam 73. The projecting end of each stub shaft 110 is provided with a sleeve 112 which has two outwardly extending opposite wing portions 113. An identical sleeve 112 with wing portions 113 is arranged on each end of the shaft 95 which projects from a frame beam 74 in which said shaft 75 is journalled. The wing portions 113 of the respective sleeves 112 are adapted to co-operate with each other to form a driving connection between shafts 87 in the central frame beam 73 and the shafts 95 in the pivotally mounted frame beams 74.

The central frame beam 73 is provided with supports 114 (FIG. 5) which extend parallel to the direction A and are provided near their front ends with pins 115 by means of which the device can be coupled with the two lowermost arms of the three point hitch or lifting device of a tractor or other vehicle towing the device. The upper side of the frame beam 73 is provided with strips 116 which extends upwardly towards each other and have upper end portions which extend parallel to each other and are interconnected by a strip 117 (FIG. 6). The upper arm or link of the three point hitch may be fastened between the parallel portions of the strips 116 by means of a pin 118. The rear side of each frame beam 74 carries two spaced lugs 119 between which is arranged a hook 120. If the frame beams 74 are turned into the positions shown in broken lines in FIG. 5, the hooks 120 can be removed from the lugs 119 arranged nearest to the outer ends of the beams 74 and can be inserted in holes formed in lugs 121 provided on the rear sides of the central frame beam 73.

The embodiment of mowing device shown in FIGS. 5 to 12 can be moved in the direction of the arrow A by a tractor or like propelling vehicle. The shaft 90 (FIG. 7) can be driven from the power take-off shaft of the tractor or the like, so that the mowing elements rotate in similar directions as in the first embodiment, and the crop is mown in the same manner and is worked subsequently. During operation, the frame beams 74 which are arranged on either side of the central frame beam 73 are capable of pivoting upwardly and downwardly with their mowing elements relative to the central frame beam 73. The pivotal connections between the beams 74 and the beams 73 are afforded by the substantially horizontal pins 101 which extend parallel to the direction A and the portions 107 of the locking pins 106, by means of which the frame beams 74 are locked in the working position. In order to convert the device to a suitable transport position, the lock between the pivotable frame beams 74 and the central frame beam 73 can be disengaged by withdrawal of the pins 106, so that the frame beams 74 can be pivoted rearwardly about the vertical stub shafts 103 until the positions shown in broken lines in FIG. 5 are reached. The hooks 120 can then be fixed with their ends secured in holes formed in the lugs 121 in the manner shown in broken lines in FIG. 5.

What I claim is:

1. A mowing device comprising a plurality of rotatable mowing elements mounted on a frame and arranged to form at least one pair of cooperating counter rotating drums, each of said mowing elements in said pair having cutting members and comprising a hollow conical drum with an opening at the bottom thereof and having exterior inclined surface means for imparting an upward lifting force on crop cut as it is passed between the elements of said pair.

2. A moving device as claimed in claim 1, wherein each of said drums have upwardly tapered outer surfaces with a spiral extension on said outer surface.

3. A mowing device as claimed in claim 2, wherein said extension is a projecting ridge spirally wound around the periphery of said drum.

4. A moving device as claimed in claim 1, wherein rotary drive shaft means is connected to said mowing elements, said shaft means extending substantially vertically and said hollow drums have said cutting members arranged on the lower sides of said drums.

5. A mowing device as claimed in claim 4, wherein each of said cutting members is mounted for turning movement about a vertical axis and each said drum has a plurality of detachable cutting members arranged on opposite sides of said drum.

6. A mowing device as claimed in claim 1, wherein each of said mowing elements are supported, at least in part, by its respective ground wheel located within the path traced by said cutting members during operation, said ground wheel being positioned in front of the axis of rotation of its respective mowing element.

7. A mowing device as claimed in claim 6, wherein each ground wheel is positioned inside said drum to be pivotable about the same axis as said drum is rotatable.

8. A mowing device as claimed in claim 7, wherein a scraper is positioned within said drum adjacent a corresponding ground wheel.

9. A mowing device as claimed in claim 8, wherein said scraper is located on the outer side of its respective ground wheel alongside which cutting members move forwardly relative to the direction of travel of said device.

10. A mowing device as claimed in claim 6, wherein the sides of said drum tapers upwardly.

11. A mowing device as claimed in claim 1, wherein said mowing elements are arranged in at least two pairs, said mowing elements being pivotally mounted on beam means included in said frame whereby each pair of mowing elements can be moved to a transport position by being pivoted about a corresponding axis which extends in the general direction of travel, said beam means and each pair of mowing elements being connected to flexible means for connection to the lifting device of a propelling vehicle, said flexible means retaining said mowing elements in raised transport position.

12. A mowing device as claimed in claim 11, wherein said beam means includes a U-shaped frame beam having limbs and the limbs of said beam extend parallel to the direction of travel, each of said limbs comprising a supporting beam for a pair of mowing elements, said mowing elements being pivotally supported on the limbs of said U-shaped frame beam.

13. A mowing device as claimed in claim 12, wherein the paths traced by the cutting members of two adjacent mowing elements of two different pairs intersect each other during operation.

14. A mowing device as claimed in claim 1, wherein there are at least two adjacent mowing elements and at least one of said mowing elements is mounted on a frame portion which is movable to a trailing transport position by turning same about a substantially vertical axis relative to the remainder of said frame, said movable mowing element and said frame portion including driving means which is disconnected to be inoperative in transport position.

15. A mowing device as claimed in claim 14, wherein there are two pivotable frame portions, each of said frame portions supporting at least one mowing element, one on each side of a central frame portion of said frame and said two pivotable frame portions extending parallel to the longitudinal axis of said central frame portion during mowing operation, said two pivotable frame portions being movable upwardly and downwardly with respect to said central frame portion during operation.

16. A mowing device as claimed in claim 15, wherein locking means is provided for fixing said two pivotable frame portions in a working position, said locking means being pivotable to afford an axis for the upward and downward turning movement of the frame portions during mowing.

17. A mowing device as claimed in claim 15, wherein driving shafts for said mowing elements are connected to one another within said two pivotal frame portions and said central frame portion, the adjacent ends of said driving shafts having cooperating parts for establishing driving connection antomatically as the pivotable frame portions are moved into the mowing position, said cooperating parts including extension on the ends of said driving shafts that cooperate with each other, each of said driving shafts having two opposite extensions.

References Cited
UNITED STATES PATENTS

| | | | |
|---|---|---|---|
| 2,973,613 | 3/1961 | Hagedorn | 56—25.4 |
| 2,984,960 | 5/1961 | Wathen et al. | 56—25 |
| 3,040,502 | 6/1962 | Smith et al. | 56—25.4X |
| 3,157,014 | 11/1964 | Bottenberg | 56—25.4X |
| 3,389,539 | 6/1968 | Zweegers | 56—6 |
| 3,400,521 | 9/1968 | Caldwell | 56—25.4 |

FOREIGN PATENTS

| | | | |
|---|---|---|---|
| 213,772 | 3/1958 | Australia | 56—25.4 |
| 1,461,426 | 11/1966 | France | 56—25.4 |

LOUIS G. MANCENE, Primary Examiner

J. A. OLIFF, Assistant Examiner

U.S. Cl. X.R.

56—295